(12) United States Patent
Forget et al.

(10) Patent No.: US 9,633,694 B2
(45) Date of Patent: Apr. 25, 2017

(54) FULL FIDELITY REMOTE VIDEO EDITING

(71) Applicant: AVID TECHNOLOGY, INC., Burlington, MA (US)

(72) Inventors: Eric Forget, Rosemere (CA); Francis A. Capria, Northborough, MA (US); Daniel Desbois, Boucherville (CA); Thomas G. Fincher, Hudson, NH (US); Richard Gratton, Hudson Heights (CA); Stephane R. Harnois, Laval (CA); Alan Swartz, Cambridge, MA (US); Min Wei, LaSalle (CA)

(73) Assignee: Avid Technology, Inc., Burlington, MA (US)

( * ) Notice: Subject to any disclaimer, the term of this patent is extended or adjusted under 35 U.S.C. 154(b) by 0 days.

(21) Appl. No.: 15/093,819

(22) Filed: Apr. 8, 2016

(65) Prior Publication Data

US 2016/0225407 A1    Aug. 4, 2016

Related U.S. Application Data

(63) Continuation of application No. 13/857,330, filed on Apr. 5, 2013, now Pat. No. 9,318,150.

(51) Int. Cl.
*G11B 27/031* (2006.01)
*H04N 21/231* (2011.01)
*H04N 21/854* (2011.01)
*H04N 21/433* (2011.01)
*H04N 21/472* (2011.01)

(52) U.S. Cl.
CPC ..... *G11B 27/031* (2013.01); *H04N 21/23106* (2013.01); *H04N 21/4331* (2013.01); *H04N 21/47205* (2013.01); *H04N 21/854* (2013.01)

(58) Field of Classification Search
None
See application file for complete search history.

(56) References Cited

U.S. PATENT DOCUMENTS

| | | | |
|---|---|---|---|
| 8,745,158 B2 | 6/2014 | Claman et al. | |
| 9,318,150 B2 * | 4/2016 | Forget | G11B 27/031 |
| 2006/0023789 A1 | 2/2006 | Yamashita et al. | |
| 2010/0262710 A1 * | 10/2010 | Khatib | G11B 27/034 709/231 |

(Continued)

OTHER PUBLICATIONS

Quantel, QTube, Product Brochure, Feb. 15, 2012, 16 pages.

*Primary Examiner* — Eileen Adams
(74) *Attorney, Agent, or Firm* — Oliver Strimpel

(57) ABSTRACT

Video editing methods and systems enable an editor to edit a video project for which source media assets are located at a media storage server located remotely from the editor with substantially the same fidelity and editing feature set that would be available if the source media assets and editor were co-located. A video editing client used by the editor maintains a persistent cache of proxy media with the layers of the video project stored independently, facilitating editing with combinations locally originated assets and remote assets. The client requests frames not already cached from the remote server via a low bandwidth network. Unless a frame is purged from the cache, no frame is requested from the server more than once. A multi-level priority prefetching scheme, including sequence-based prefetching, populates the cache with frames likely to be requested during editing.

15 Claims, 2 Drawing Sheets

(56) References Cited

U.S. PATENT DOCUMENTS

| | | | |
|---|---|---|---|
| 2012/0084404 A1* | 4/2012 | Haot | G11B 27/034 709/219 |
| 2014/0019688 A1* | 1/2014 | Ghodsnia | G06F 12/0866 711/135 |
| 2014/0032775 A1 | 1/2014 | Abiezzi | |

* cited by examiner

FULL FIDELITY REMOTE VIDEO EDITING

CROSS REFERENCE TO RELATED APPLICATIONS

This application claims priority to and the benefit of, under 35 U.S.C. §120, and is a continuing application of pending U.S. application Ser. No. 13/857,330, filed Apr. 5, 2013, which is incorporated herein by reference.

BACKGROUND

In traditional digital media editing systems, such as non-linear video editors, the source media assets that form the basis of a media project that is being edited are stored locally to the video editor. For example, the video editing application may run on a client system on a local area network with network attached storage that stores the source assets. For smaller systems, the media may be stored on a drive that is integral to the client system, or directly attached to it. While this arrangement may be convenient for post production environments, it is not the setup that is increasingly adopted for television broadcasting environments, especially for news program generation and broadcasting. Here it is typical for small teams, such as a cameraman and reporter, to be located in the field where they are capturing media. When time to air is of the essence, it is desirable for such field teams to be able to import their locally captured assets into a video editing system and to edit a news program in situ using both their local assets and existing assets that are stored on remote servers at the news station facilities or in the cloud.

A video editor may be situated remotely from the project source media assets in situations other than news creation. For example, an organization may have facilities at two different locations, with its video editors at one location, and its system infrastructure, including media storage servers, at another.

Since media files tend to be large, existing remote video editing systems typically have to adapt to delays in retrieving media files from remote locations that are caused by bandwidth limits and system latency. Such adaptation results in the imposition of various limits on the editing functionality available to users of remote video editing systems. For example, it may not be possible to include local assets in a project without first uploading them to the remote storage system. Other systems limit the editor to straight cuts. Color correction, clip transition edits, and effects may not be supported.

In an increasingly distributed media creation environment, there is a need to address the limitations currently imposed on remote video editors.

SUMMARY

In general, the methods, systems, and computer program products described herein enable a user of a video editing application that is remote from the source video assets to edit a video project with the full functionality that would be available if the sources assets were local. Bandwidth constraints between the system hosting the video editing application and the source assets may affect the quality of the proxy the editor uses, but do not limit the scope of the editing operations that can be performed.

In general, in one aspect, a method of editing a video project at a client system in data communication via a low bandwidth connection with media storage that stores source media assets of the video project comprises: maintaining on the client system a cache of a portion of a proxy of the video project; providing on the client a video editing application capable of displaying the proxy on a display of the client system; and in response to the video editing application receiving a command from a user of the video editing application to play back the video project proxy on the display starting from a selected frame, retrieving the selected frame of the proxy from the cache if the selected frame is present in the cache, and requesting the selected frame of the proxy from the media storage if the selected frame is not present in the cache.

Various embodiments include one or more of the following features. In response to requesting the selected proxy frame from the media storage: receiving the requested frame; displaying the requested frame on the display; and storing the requested frame in the cache. Data communication over the low bandwidth network is interrupted, and if the selected frame is not present in the cache, retrieving an alternate frame from the cache, wherein the alternate frame corresponds to a first temporal location in the video project subsequent to a temporal location corresponding to the selected frame for which a frame is present in the cache; and displaying the alternate frame on the display. The video project comprises a plurality of layers and the portion of the proxy in the cache comprises a corresponding plurality of layers, and wherein playback of the proxy on the client includes compositing the plurality of layers of the proxy on the client. The plurality of layers includes two or more layers of video. The plurality of layers includes a layer of media that is retrieved from the media storage and a layer of media corresponding to a source media asset stored on the client. The source media assets include a plurality of layers corresponding to a temporal location in the media project of the selected frame, and retrieving the selected frame of the proxy from the media storage and storing the selected proxy frame in the cache comprises separately retrieving proxy representations of the plurality of layers of the selected frame and storing the proxy representations of the plurality of layers of the selected frame in the cache. The cache is a persistent cache, and includes at least a portion that is stored on a hard disk drive or a solid state drive. The cache includes images corresponding to individual frames of proxy video. The cache includes groups of pictures compressed using an interframe video compression scheme. The source media assets include media in an original format of a source from which the asset originated. The source media assets include media in a proxy format. The selected frame is a frame of a media clip included in the project, and automatically retrieving from the media server portions of the media clip not present in the cache in addition to the selected frame. In response to a second request from the user to play back the proxy starting from a second selected frame, if the second selected frame is not present in the cache, suspending the automatic retrieval of portions of the media clip not present in the cache, retrieving the second selected frame of the proxy from the media storage, and storing the second selected frame in the cache. For each of a plurality of temporally successive frames temporally succeeding the selected frame of the video project proxy: if the frame is not present in the cache, requesting the frame from the media storage; and if in response to the request, the frame is received from the media storage in time to maintain real-time playback on the display, storing the frame in the cache and displaying the frame on the display; and if in response to the request, the frame is not received from the media storage in time to maintain real-time playback on the display, requesting a succeeding frame that is not present in the cache from the media server.

In general, in another aspect, a method of editing a video project at a client system in data communication over a low bandwidth connection with media storage that stores source media assets of the video project comprises: maintaining on the client system a cache of a portion of a proxy of the video project; providing on the client a video editing application, wherein the video editing application is capable of displaying the proxy on a display of the client system; and in response to the video editing application receiving an editing command from a user of the video editing application involving a media clip of the video project, requesting one or more proxy frames of the media clip that are not present in the cache from the media storage, and storing the one or more proxy frames of the media clip in the cache. The editing command comprises adding the media clip to the video project, scrubbing through the media clip, or requesting playback of the media clip.

In general in yet another aspect, a computer program product comprises: a computer-readable medium with computer program instructions encoded thereon, wherein the computer program instructions, when processed by a computer, instruct the computer to perform a method for remote video editing comprising: maintaining on the computer a cache of a portion of a proxy of a video project; implementing on the computer a video editing application, wherein the video editing application is capable of displaying the proxy on an output display connected to the computer; and in response to the video editing application receiving a command from a user of the video editing application to play back the video project proxy on the output display starting from a selected frame, retrieving the selected frame of the proxy from the cache if the selected frame is present in the cache, and requesting the selected frame of the proxy from a remote server in data communication with the computer via a low bandwidth network if the selected frame is not present in the cache.

DETAILED DESCRIPTION

Figure 1:
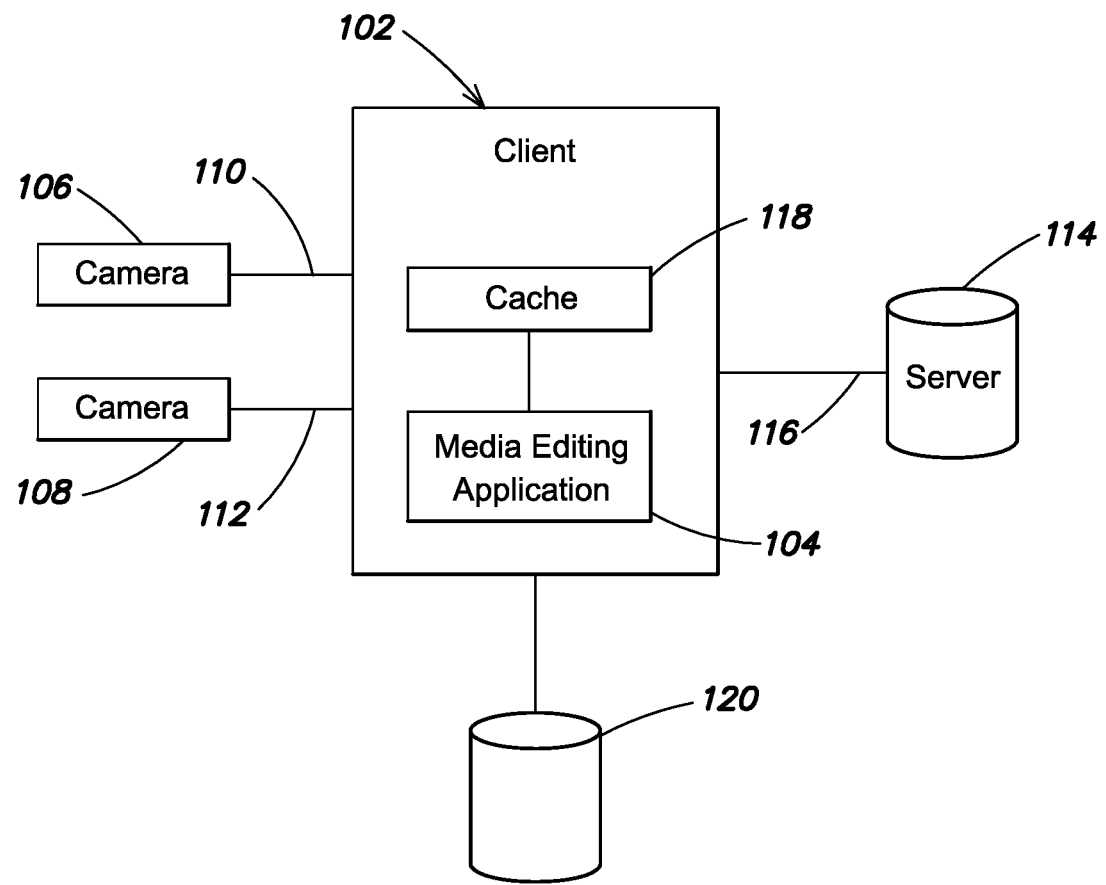
FIG. 1 is high level block diagram of a remote video editing system.

In traditional media editing environments, the editing of a media project is performed using a media editing application, such as a non-linear video editor or a digital audio workstation hosted on a platform that is connected to the source media assets forming the basis of the media project. In one typical arrangement, the media application host and the media storage server are connected via a high bandwidth local area network, such as a 1 Gbit/s or 10 Gbit/s Ethernet network. Alternatively, source media assets may be present on directly attached storage, such as in internal or external hard drive of the editing application host. In such arrangements, the media editing application is able to retrieve source media assets at a high enough rate and low enough latency to be able to service the proxy media requests of the media editing application. For example, if the user plays back a portion of a video sequence being edited, the application is able to request and display the relevant video clip responsively, either by retrieving from the server a pre-generated proxy version or converting the source assets into a proxy on-the-fly.

The situation is quite different in the remote media editing context. As used herein, remote media editing refers to editing media using a media editing application that is situated remotely from the media assets that form the basis of what is being edited. For example, a video editor using a non-linear video editing application, such as MEDIA COMPOSER® from Avid® Technology, Inc. of Burlington Mass. may be located in one facility in a first location, and the media storage server that stores the media assets being used to create the edited video may be located in a separate facility in a different location. As a consequence of the separation between these two locations, the data connection between the editor and the server is likely to be much lower and to have much higher latency than the connection typical of co-located application host (i.e., client) and media server environments. In an example where a client is connected via a wireless or wired Internet connection in a field location, the connection may be as low as 2 Mbit/s, with a latency of about 500 ms. Such connection speeds are at least two orders of magnitude slower that those between a co-located client and server.

The radically reduced connection speeds and increased latency between editing client and media server that result from remote editing have especially significant consequences for video editing, since the video files tend to be large, and normal bandwidth requirements for proxy video playback exceed the available bandwidth, which may be about 2-4 Mbits/s. The high latency of the connection can also introduce undesirable sluggishness in response to playback or scrubbing commands.

Various approaches have been adopted to address this situation. In one example, the media server applies the most recent set of edit decisions to the source media, and streams a proxy consisting of a single, flattened video stream to the client. Since even a single stream may not be accommodated by a low-speed connection, the resolution and/or frame rate of the streamed proxy can be adjusted to respond in real time to the available network capacity. Another approach taken to overcome the limitations of low bandwidth connections is to compress the proxy before sending it to the client. Compression schemes commonly involve interframe compression using groups of pictures (GOPs), in which only certain frames (I-frames) are transmitted as full images, and intermediate frames as difference images (P and B frames). Prior to playback, the client needs to decompress the received video. This can be especially compute-intensive if a P or a B frame within a long GOP is required, as one or more I frames may have to be retrieved, and several intermediate frames computed. In some schemes, playback or scrubbing may be limited to the I-frames at various junctures in the editing process.

A consequence of these remote video editing methods is a reduction in the editing functionality available to the remote video editor. In the first example mentioned above, in which the editing commands are applied to the source and a flattened stream is sent, the remote editor is not able to perform edits that require two or more layers of the video project to be separate, such as clip transition effects, and the mixing of local assets and remote assets. As used herein, the term "layer" refers to an element of a video project being edited, such as a video clip, audio clip, transition effect, special effect, and titles. When elements are placed within a sequence timeline, the layers all have the same length, and a layer is commonly referred to as track. The terms are used interchangeably herein. When interframe video compression is used for the transmitted proxy, the need to reconstruct most of the frames from I-frames before being able to display them means that frame-accurate trimming is not practical.

The remote video editing methods and systems described herein enable a remote video editor to perform full fidelity video editing. As used herein, full fidelity video editing refers to editing with substantially the same editing functionality that would be provided to an editor co-located with the media storage server using the same video editing application as that of the remote video editor.

A high level system diagram of a remote video editing environment is shown in FIG. 1. Client 102 hosts media editing application 104. Various media capture devices such as cameras 106 and 108 and/or other local sources of local media assets are connected to client 102, using wired or wireless connections 110 or 112. Data can then be downloaded from the camera or other source onto the client's local storage. The client is in data communication with remote media server 114 via low bandwidth connection 116. Remote media server 114 may be hosted in the Cloud, or may be located in a dedicated media center, and may include general purpose digital storage or specialized storage optimized for handling video files. When a user of the media editing application works on a media project, the current state of the project is rendered by a player within the editing application using a proxy version of the media, which is usually at a lower quality than the source media. The editing actions of the user are captured in the form of editing decisions, and sent back to the server over low bandwidth connection 116 as an edit decision list. In some situations, the client may also generate a proxy version of the local media assets and upload them to the server. It would not typically be practical to use the low bandwidth connection to upload the local source media assets as these files are likely to be too large. Instead, the source media are either transferred by transporting physical media, such as magnetic tape or drives, optical media, or solid state memory to the remote server location, or the transfer is accomplished when a high bandwidth connection to the remote server becomes available.

In order to enable remote video editing with multiple layers, it is necessary for more than one layer of a project to be available for editing by the remote editor. This is achieved by providing the individual layers to the client separately without first flattening them on the server. When application 104 requires a particular portion of the proxy media of the project being edited, it receives the portion in independent, separate layers, as if the media were being retrieved from local storage. This multilayer portion of the proxy may be retrieved from local, client-side cache 118, local media storage (e.g., if the media was sourced locally) 120 or over low bandwidth connection 116 from server 114. In the case of retrieval from server 114, the separate layers generated by the server are divided into chunks and sent sequentially and independently of each other over connection 116. In various embodiments, the frames for the multiple layers requested by the client are sent one at a time in asynchronous fashion. Considerations that determine the appropriate size of the chunk include available bandwidth and latency. Longer chunks serve to reduce the impact of latency, but responsiveness of the remote playback and scrubbing may be impaired and a heuristic may be used to adjust the chunk size in response to current network connection conditions in order to maintain acceptable responsiveness. In a typical field editing environment, a video chunk size of 1-10 frames may provide a good compromise for JPEG frames comprising about 10-30 KB of data. In aggregate, the streaming of multiple layers for each portion of a project, such as a clip, is equivalent to streaming multiple single-layer clips. Remote media assets may be requested and received from more than one remote server, with each of multiple servers being in a different geographical location, or being hosted at unknown locations in the Cloud.

Each of the layers is streamed to the client as a series of individual frames with no interframe compression, though the individual frames may be represented in a compressed format, such as JPEG. The client is thus able to display each of the received images without reference to other frames. This supports playback and scrubbing modes that are accurate to the level of the individual frame. It also makes the client responsive to the user commands, as the computationally significant task of decoding P or B frames is not needed, with no consequent lag. The audio is also sent in parallel with the video in the form of audio chunks sent sequentially, in either compressed (e.g., MP3) or uncompressed form.

Figure 2:
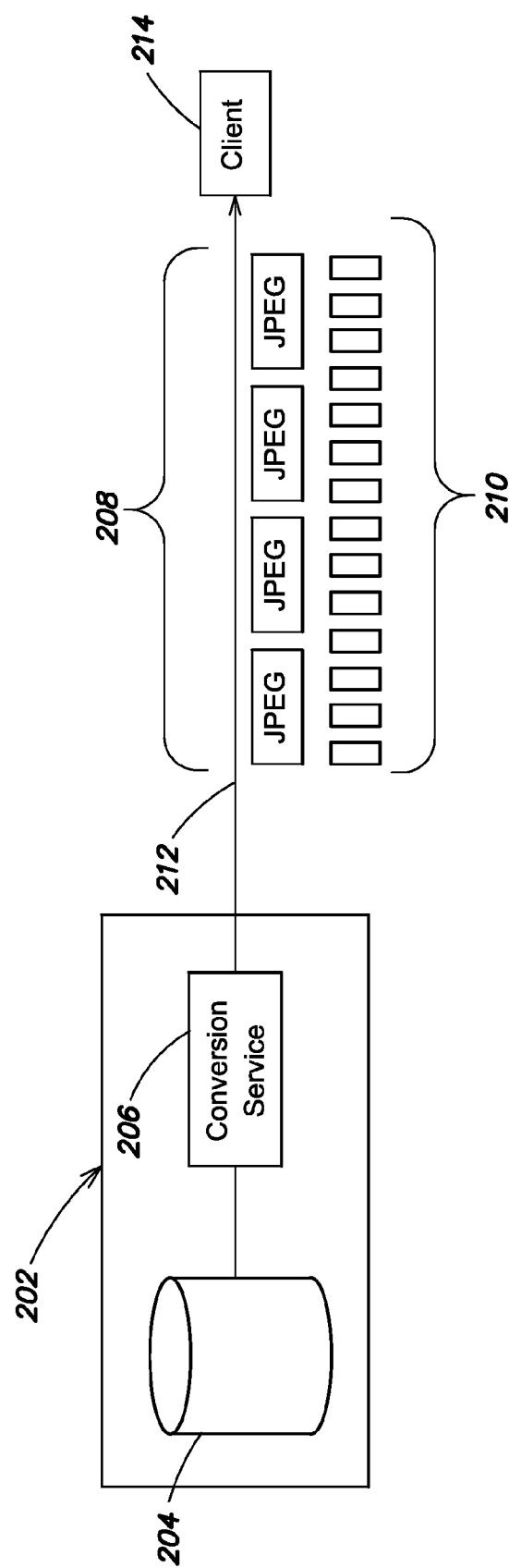
FIG. 2 is a high level block diagram of remote frame-based playback.

The frame based streaming of proxy material from remote server 114 to client 102 is implemented using a media conversion software on the server, as illustrated in FIG. 2. The conversion software may include an on-the-fly transcoder capable of reading frames either in a temporally forward direction or in a backward direction to support playback mode (real-time forward or backward playback), as well as jumping forward or backward to a specified frame to support scrubbing mode. Remote server 202 retrieves from storage 204 the source media used to supply the requested frames, which may be the original, full quality source media, or a reduced quality version that may already be present on the server. This media is converted into single frames at the appropriate quality by conversion service 206, and then streamed as individual complete frames 208 together with its accompanying compressed or uncompressed audio 210 (e.g., uncompressed PCM) over low bandwidth network 212 to client 214. The conversion of any source media (including proxies on the server) to a standard independent frame format obviates the need for the client to be aware of the server-side format, which recues the decoding requirements at the client to straightforward JPEG image decoding.

Each of the frames received over low bandwidth connection 116 is stored in a persistent cache on the client, and is retained until space is reclaimed as part of a purging cycle. A persistent cache may be implemented in part on a hard disk drive, or on another storage medium that persists from one user session to another. Frames are received at the proxy in an order determined in part by the actions of the user of the media application, as described below. The cache has a granularity of individual frames, i.e., there is no requirement that frames be fetched and stored as a group, either sequential or otherwise. In the described embodiment, the cache is implemented as a two-level cache, with a primary memory cache for the most frequently requested images, and a disk cache for the less often used images. The size of both the memory and disk caches can be adjusted by the user or adjusted automatically by the system based on available memory and disk resources. Purges are conducted when the memory or disk caches reach their capacity. The cache is indexed using a hashing scheme that enables the media application to determine whether or not a required frame is present simply by consulting the index without any searching. In an exemplary client system for an individual user, the memory cache is about 100-300 MB and the disk cache is about 1-4 GB.

The strategy for populating the cache is driven by the desire to optimize the use of the low bandwidth between the client and the server. Such optimization is achieved by attempting to avoid requesting a given frame from the server more than once, i.e., by retaining all received frames in the cache wherever possible, and by prefetching frames according to user behavior and the clip structure of the sequence being edited into the media project.

The media application requests frames from the server over the low bandwidth connection according to a multi-tier priority scheme. The highest priority fetches are triggered by a playback request. In a typical non-linear video editor, the editing is conducted using a timeline representation of the media project. The user selects a particular temporal location within the timeline, such as by clicking on it or by dragging a "time now" line to the desired location in the timeline. When the user starts playing back from the selected location, the application checks to see if a required frame is present in the client cache, and if is, it retrieves it from the cache for playback. If the frame is not present in the cache, it issues a high priority request for the frame to the server, which responds by sending the requested frame. When the frame is received it is displayed in a player window on a display of the client system running the editing application and is stored in the client cache. Successive frames are requested at high priority as long as playback continues. If the bandwidth available on the low bandwidth connection does not enable frames to be sent and received at the full frame rate, which is typically 30 frames per second, frames will be skipped so that playback can keep up with real-time. This may have the effect of reducing the smoothness of the proxy playback, but would not impact the user's ability to perform full fidelity frame-accurate editing. When the user wishes to perform a cut during playback mode, the frame at which the playback is stopped to identify where the cut is to be placed is somewhat approximate owing to the user's finite reaction time. Editors may then perform a second pass to fine-tune the exact cut point. The fine-tuning actions involve scrubbing in the vicinity of the desired cut point. When in scrub mode, the system requests any frames that may have been omitted during playback mode, thus enabling the editor to view all the frames required for a selecting a frame-accurate cut point. In certain circumstances stringent bandwidth constraints may necessitate reducing the quality of each of the individual frames, such as by reducing one or more of the resolution, bit depth, and compression quality. Since the quality and synchronicity of audio has a very large impact on user perception of the playback, and since audio requires much less bandwidth than video, audio samples are not dropped during playback, even if video frames must be skipped to maintain real-time playback. Any compression applied to the audio is kept to a level that does not significantly affect quality.

If the user stops playback in the middle of a clip, a low priority batch fetch job is issued to retrieve any of the remaining frames not already present in the cache from the server. If frames in the partially played back clip were skipped during playback mode, low priority fetching also retrieves these frames.

If the user jumps to a different location in a given clip, or to another clip in the timeline, the high priority fetching jumps to that location to service the new play-back request. Once playback stops, background prefetching is resumed.

When the user scrubs through the sequence, i.e., fast-forward or fast rewind, any active low priority prefetching tasks are interrupted and frames corresponding to the current location of the "time now" (or scrubbing) bar are retrieved. For example, for rapid fast forward, it might be necessary only to retrieve every $100^{th}$ frame.

Prefetches may also be initiated for a new clip when it is inserted into the timeline sequence, even in the absence of a playback request.

The presence of a persistent, multi-layer cache together with multi-layer streaming from the server to provide frames not present in the cache supports several aspects of full fidelity remote editing. For example, editing functions based on the presence of more than one independent layer include: re-editing a prior compositing decision; inserting a new or changed transition between clips; adding new compositing effects such as picture-in-picture; and layer-by-layer color correction. For field editing situations in which local assets are being generated that have not yet been uploaded to the server, such assets can readily be introduced after retrieval from the local originating device (e.g., cameras 106 and 108 connecting via connections 110 and 112) into local storage, and added into the sequence as one or more additional layers. As such, local assets share the same status as the pre-existing layers that are based on remote assets, and enable seamless editing of local and remote assets into the sequence. For news broadcasting applications where time-to-air is crucial, such capability can greatly accelerate the production of a breaking news story since there is no need to upload media to a remote server prior to commencing editing. The locally originated assets can later be transported to the server on magnetic, optical, or solid state storage, or via a high bandwidth connection when available.

Multi-level priority fetching of frames from the server, and the avoidance of repeat transfers of frames optimizes bandwidth utilization as well as the responsiveness of the application to a user's playback, jumping, and scrubbing actions.

The client-side cache also serves to make the remote video editing resilient to temporary interruptions in connectivity. Since a significant number of the proxy frames are likely to be present in the cache, editing can continue based on the frames that are present even when frames cannot be retrieved from the server. If a particular frame requested for playback or scrubbing is present in the cache, the user is unaffected by the interruption. On the other hand, if a requested frame is not in the cache, the system may look ahead in the direction of playback or scrubbing to the next frame that is present in the cache, and display that frame as an alternate to the requested frame. If the cache is reasonably well populated, then the display of the proxy may remain accurate enough to support most if not all editing functions. When connection is restored, any editing decisions made are synchronized with the server, and the transfer of any needed proxy frames resumes. This aspect may be valuable when editing is performed on the road or in a train when wide area connectivity is often interrupted for short periods of time.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method comprising:
   providing a video editing application on a client system in low bandwidth data communication with media storage that stores source media assets of a multi-layer video project, the video editing application being capable of displaying the multi-layer video project on a display of the client system;
   maintaining on the client system a cache of a portion of the multi-layer video project; and
   in response to the video editing application receiving a command from a user of the video editing application to play back the multi-layer video project on the display starting from a selected multi-layer frame:
      for each layer of a plurality of layers of the selected frame:
         when the layer of the selected frame is present in the client cache, retrieving the layer of the selected frame from the client cache; and
         when the layer of the selected frame is not present in the client cache:
            requesting the layer of the selected frame from the media storage; and
            receiving the layer of the selected frame; and
      compositing the plurality of layers of the selected frame; and
      displaying the composited frame on the display of the client system.

2. The method of claim 1, wherein a layer of the selected frame is not present in the client cache, further comprising, after performing the requesting and receiving steps, storing the received layer of the selected frame in the cache.

3. The method of claim 1, wherein low bandwidth data communication is interrupted, further comprising:
   if the selected frame is not present in the cache, retrieving an alternate frame from the cache, wherein the alternate frame corresponds to a first temporal location in the video project subsequent to a temporal location corresponding to the selected frame for which a frame is present in the cache; and
   displaying the alternate frame on the display.

4. The method of claim 1, wherein the multi-layer video project includes two or more layers of video.

5. The method of claim 1, wherein the cache is a persistent cache.

6. The method of claim 1, wherein the cache includes images corresponding to individual frames of video.

7. The method of claim 1, wherein the cache includes groups of pictures compressed using an interframe video compression scheme.

8. The method of claim 1, wherein the source media assets include media in an original format of a source from which the asset originated.

9. The method of claim 1, wherein the source media assets include media in a proxy format.

10. The method of claim 1, wherein the selected frame is a frame of a media clip included in the project, and further comprising automatically retrieving from the media storage portions of the media clip not present in the cache in addition to the selected frame.

11. The method of claim 10, wherein in response to a second request from the user to play back the media clip starting from a second selected frame, if the second selected frame is not present in the cache, suspending the automatic retrieval of portions of the media clip not present in the cache, retrieving the second selected frame from the media storage, and storing the second selected frame in the cache.

12. The method of claim 1, further comprising:
for each of a plurality of temporally successive frames temporally succeeding the selected frame of the video project:
if the frame is not present in the cache, requesting the frame from the media storage; and
if in response to the request, the frame is received from the media storage in time to maintain real-time playback on the display, storing the frame in the cache and displaying the frame on the display; and
if in response to the request, the frame is not received from the media storage in time to maintain real-time playback on the display, requesting a succeeding frame that is not present in the cache from the media server.

13. A method of editing a video project at a client system, the method comprising:
maintaining on the client system a cache of a portion of the video project;
providing on the client a video editing application capable of displaying the video project on a display of the client system; and
in response to the video editing application receiving a command from a user of the video editing application to play back the video project on the display starting from a selected frame of the video project;
when the selected frame of the video project is present in the client cache, retrieving the selected frame of the video project from the client cache; and
when the selected frame of the video project is not present in the client cache:
requesting the selected frame of the video project from media storage that is in low bandwidth data communication with the client system, the media storage storing source media assets of the video project, the source media assets including a plurality of temporally aligned layers of the video project;
receiving each of a plurality of layers of the selected frame of the video project;
compositing the received plurality of layers of the selected frame of the video project; and
displaying the composited frame of the video project on the display of the client system.

14. The method of claim 13, further comprising storing the received plurality of layers of the selected frame in the cache.

15. A computer program product comprising:
a non-transitory computer-readable medium with computer program instructions encoded thereon, wherein the computer program instructions, when processed by a client system in low bandwidth data communication with media storage that stores source media assets of a multi-layer video project, instruct the client system to perform a method of editing a multi-layer video project, the method comprising:
maintaining on the client system a cache of a portion of the multi-layer video project;
providing on the client a video editing application capable of displaying the multi-layer video project on a display of the client system; and
in response to the video editing application receiving a command from a user of the video editing application to play back the multi-layer video project on the display starting from a selected multi-layer frame:
for each layer of a plurality of layers of the selected frame:
when the layer of the selected frame is present in the client cache, retrieving the layer of the selected frame from the client cache; and
when the layer of the selected frame is not present in the client cache:
requesting the layer of the selected frame from the media storage; and
receiving the layer of the selected frame; and
compositing the plurality of layers of the selected frame; and
displaying the composited frame on the display of the client system.

* * * * *